United States Patent [19]

Kawamura

[11] Patent Number: 4,657,368

[45] Date of Patent: Apr. 14, 1987

[54] AUTOMATIC EXPOSURE CONTROL DEVICE

[75] Inventor: Masaharu Kawamura, Kanagawa, Japan

[73] Assignee: Canon Kabushiki Kaisha, Tokyo, Japan

[21] Appl. No.: 828,578

[22] Filed: Feb. 10, 1986

Related U.S. Application Data

[63] Continuation of Ser. No. 601,742, Apr. 19, 1984, abandoned, which is a continuation of Ser. No. 452,073, Dec. 22, 1982, abandoned.

[30] Foreign Application Priority Data

Dec. 24, 1981 [JP] Japan ................................ 56-208083
Dec. 24, 1981 [JP] Japan ................................ 56-208084

[51] Int. Cl.4 ............................................ G03B 7/095
[52] U.S. Cl. .................................... 354/452; 354/453
[58] Field of Search ................ 354/446, 412, 451–453, 354/455, 271.1, 270, 272; 352/121, 141

[56] References Cited

U.S. PATENT DOCUMENTS

| | | | |
|---|---|---|---|
| 3,827,067 | 7/1974 | Yamamichi et al. ................. | 354/412 |
| 3,842,587 | 10/1974 | Strauss ................................. | 354/412 |
| 4,299,459 | 11/1981 | Mizokami ............................ | 354/452 |
| 4,322,144 | 3/1982 | Suzuki et al. ....................... | 354/453 |
| 4,344,678 | 8/1982 | Mizokami ............................ | 354/452 |
| 4,363,540 | 12/1982 | Takishima et al. ................. | 354/451 |
| 4,415,248 | 11/1983 | Suzuki et al. ....................... | 354/446 |
| 4,423,937 | 1/1984 | Suzuki et al. ....................... | 354/446 |

Primary Examiner—W. B. Perkey
Attorney, Agent, or Firm—Toren, McGeady and Goldberg

[57] ABSTRACT

An automatic exposure control device for a continuous photographing in a single lens reflex camera with an automatic exposure control system in which exposure control is effected by sensing a light beam passing through a phototaking lens and continuous photographing can be made. A device for discriminating a continuous photographing mode is provided and, when the continuous photographing mode is selected, a first photographing action to carry out an automatic exposure control by a full-open photometry is performed after a release action, and, then, for a photographing action thereafter, the light beam passing through a diaphragm aperture regulated by a preceding photographing action is sensed. A diaphragm mechanism is thereby regulated for carrying out the next photographing action.

18 Claims, 5 Drawing Figures

AUTOMATIC EXPOSURE CONTROL DEVICE

This is a continuation of application Ser. No. 601,742, filed Apr. 19, 1984, which was a continuation of application Ser. No. 452,073, filed Dec. 22, 1982, both now abandoned.

BACKGROUND OF THE INVENTION

1. Field of the Invention

The present invention relates to automatic exposure control, especially to an automatic exposure control device in a single lens reflex camera for continuous photographing.

2. Description of the Prior Art

When exposure control is effected by full-open photometry or an actual aperture photometry in a single lens reflex camera with an automatic exposure control device for continuous photographing, a diaphragm aperture is controlled from the full-open aperture of the lens to a regulated aperture and an exposure is made by a shutter opening action. After an elapse of any length of control time to make an appropriate exposure, the shutter makes a closing action, then the diaphragm aperture is returned to a full-open aperture position again. That is, after a completion of one exposure action, a diaphragm aperture is always returned to a full-open aperture position and is to be stopped down again at the time of a subsequent exposure action in a continuous photography. For example, in the case of an exposure control by a full-open photometry, an example of a conventional continuous photographing action is performed in the following manner:

(1) photometry of a light beam passing through a lens is initiated during the state of a full-open aperture by a first switch, and an exposure control value is displayed within a view finder, then a release signal is generated as a second switch is turned ON.

(2) full-open photometry for an exposure control is performed by the release signal thus generated, for memorizing the photometry value.

(3) a diaphragm aperture is stopped down at the same time with a mirror up to a controlled aperture value based on the memorized photometric value or a predetermined set aperture value by a release of a first fastening.

(4) and an opening and closing action of a shutter is performed with a control time based on a predetermined set time or the above-mentioned memorized photometric value.

(5) after that the diaphragm is returned to the full-open position.

(6) and, a film is mechanically loaded by a film wind up action for a subsequent photographing, and at the same time one frame of the film which has been exposed is advanced.

(7) during this state, the state mentioned above for the paragraph (2) is resumed, then the above-mentioned series of actions are repeated, thus making a continuous photographing.

As has been described above, a method for returning the diaphragm to the full-open position every time the exposure is made has been a great obstacle in enhancing the speed of continuous photographing when a diaphragm mechanism with poor responsive characteristics is used or when the responsive characteristics of the diaphragm mechanism become poor in a low temperature circumstance. Especially in a diaphragm mechanism using a step motor, since a length of time required for control in every step becomes almost constant, as the number of steps for aperture control becomes larger, that is, as the number of aperture steps is larger, a longer control time is needed. Such shortcoming becomes conspicuous in a physical diaphragm using a liquid crystal diaphragm or EC (electro-chromi diaphragm), because of the limited response time. And when adverse effect in the low temperature circumstance is also imposed on such a diaphragm, the shortcoming becomes still greater.

SUMMARY OF THE INVENTION

An object of the present invention is to eliminate the above-mentioned shortcomings in conventional devices and is to provide an automatic exposure control device in which, even if a diaphragm mechanism using a step motor or a physical diaphragm, as an example, not having a high speed response characteristic is used, high speed continuous photographing by automatic exposure control can be made without returning a diaphragm to a full-open position during a continuous photographing mode, but can be made by making photometry under a stopped down state by a preceding photographing for making an automatic exposure control in a continuous photographing by so controlling the diaphragm, thus enabling high speed continuous photographing.

Further another object of the present invention is to provide a camera having a diaphragm device of a type to determine an aperture value by an opening diameter of diaphragm blades, in which means for detecting a stop down of the diaphragm is provided when an opening action of the diaphragm blades is performed by a stepping motor, so that the diaphragm is driven to a full-open position thus allowing full-open photometry.

BRIEF EXPLANATION OF THE DRAWINGS

FIG. 3 to FIG. 5 are to show yet another example of the present invention, wherein FIG. 4 is a diaphragm control circuit, while

DESCRIPTION OF THE PREFERRED EMBODIMENTS

Now, embodiments of the present invention shall be described referring to the accompanying drawings.

Figure 1:
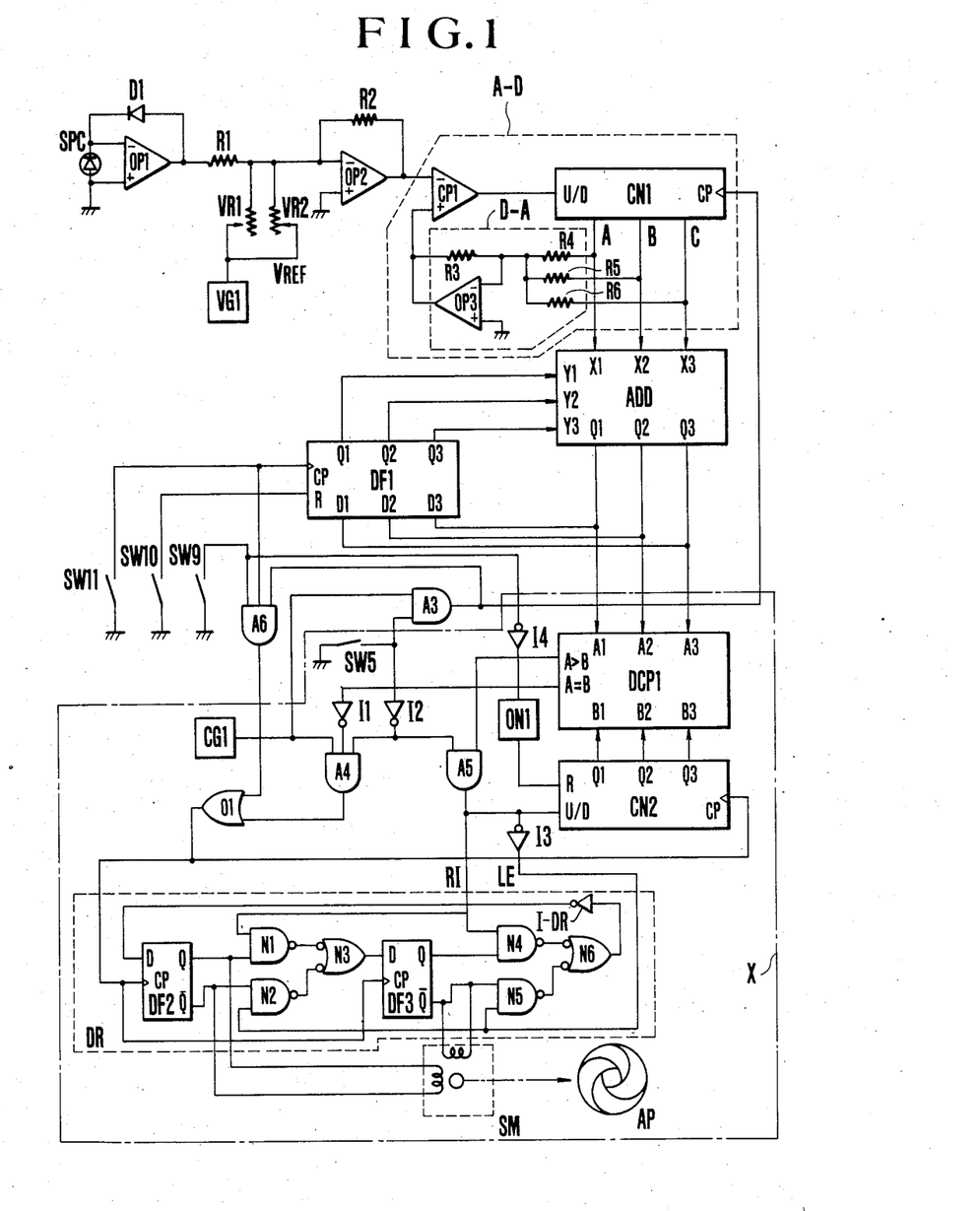
FIG. 1 is a circuit diagram of an example of an automatic exposure control device according to the present invention.
Figure 2:
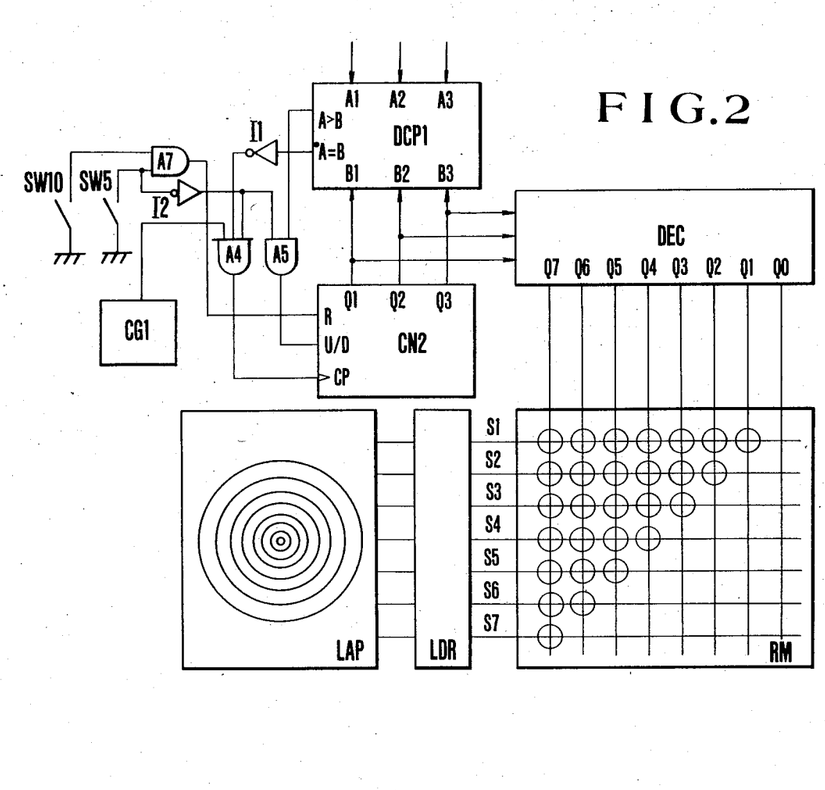
FIG. 2 is a partial circuit diagram of another example of an automatic exposure control device according to the present invention.

FIG. 1 is a circuit diagram of an automatic exposure control device in one example of the present invention. FIG. 2 is a partial circuit diagram used in a portion of an automatic exposure control device in another example of the present invention.

In FIG. 1, what is shown as OP1 is an operational amplifier with a high impedance input, and a light receiving element SPC is connected to an input side of said operational amplifier OP1, and a compresssion diode D1 is provided at a feed back path of the amplifier. By this circuit arrangement, a logarithmically compressed information BV is produced as a voltage corresponding to an object brightness at an output side of the operational amplifier OP1.

The output side of the operational amplifier OP1 is connected to an inverted input terminal side of an operational amplifier OP2 through a resistor R1, while a non-inverted input terminal side of the operational amplifier OP2 is grounded. What is shown as VG1 is a constant voltage source and a constant voltage $V_{REF}$ of said constant voltage source VG1 is given to sliding pieces of variable resistors VR1, VR2, and these sliding pieces are connected to the inverted input terminal side of the operational amplifier OP2. Also, a resistor R2 is provided at a feedback path of the operational amplifier OP2, and this operational amplifier OP2 makes an operational processing of the above-mentioned logarithmically compressed information BV, and a film sensitivity information SV as well as a shutter time information TV which are set information being introduced from setting members (not shown in the drawing) through the variable resistors VR1, VR2, respectively, that is to make an operational processing of the information, BV+SV−TV. Therefore, an APEX value of an aperture information is produced at the output side of the operational amplifier OP2 in a reversely proportional relationship with a voltage.

CP1 is a comparator and the output side of the operational amplifier OP2 is connected to an inverted input terminal side of said comparator CP1, while the output terminal side of the same is connected to an up-down selection terminal U/D of an up-down counter CN1. Output terminals A, B, C of the up-down counter CN1 are connected to a resistor R3 through resistors R4, R5, R6, respectively, and at the same time are connected to an inverted input terminal side of an operational amplifier OP3. The resistor R3 is also connected to a non-inverted input terminal side of the comparator CP1, and an output side of the operational amplifier OP3 is also connected to the non-inverted input terminal side of the comparator CP1. A non-inverted input terminal side of the operational amplifier OP3 is grounded. Here the resistors have resistance values which form multiple series, respectively set therein, and a voltage corresponding to digital values of output terminals A, B, C are formed at an output side of the operational amplifier OP3 in an inversely proportional relationship with the digital values. And the resistors R3, R4, R5, R6 and the operational amplifier OP3 constitute a digital-analog converter D-A, while the digital-analog converter D-A, the comparator CP1 and the up-down counter CN1 constitute an analog-digital converter A-D. A pulse generator CG1 is connected through an AND gate A3 to a clock input terminal of the up-down counter CN1 of the analog-digital converter A-D, so that clock pulses are introduced therein. Further, a switch SW5 is connected to an input side of the AND gate A3, and said switch SW5 is placed in an OFF state before a shutter actuation of the camera, that is during a photometric operation so that a signal of a high level is introduced into the AND gate A3. In this circuit arrangement, the comparator CP1 compares the output signal of the operational amplifier OP2 and the output signal of the operational amplifier OP3, and when the output signal, for example, a voltage, of the operational amplifier OP3 is higher than the output signal, for example a voltage, of the operational amplifier OP2, the output signal of the comparator CP1 attains a high level, and said high level output signal selects the up count-down and count selection terminal C/D of the up-down counter CN1 so as to actuate the same in an up count, thus counting the clock pulses introduced from the pulse generator CG1 in an up count, and contrary thereto, when the output signal of the operational amplifier OP3 is lower than the output signal of the operational amplifier OP2, the output signal of the comparator CP1 attains a low level to actuate the up-down counter CN1 in a down count, contrary to the above case, so that the clock pulses introduced from the pulse generator CG1 are counted in a down count. Therefore, the output terminals A, B, C of the up-down counter CN1 that is the output side of the analog-digital converter A-D will have the analog output signal of the operational amplifier OP2 converted into a digital value. When is shown as ADD is an adder, and the above-mentioned output terminals A, B, C of the up-down counter CN1 are connected to the input terminals X1 to X3 at one side of the adder ADD, while output terminals Q1, Q2, Q3 of three D-type flip-flops circuit DF1 are connected to input terminals Y1 to Y3 at the other side of the adder ADD. The output terminals Q1, Q2, Q3 of the adder ADD are connected to input terminals D3, D2, D1 of the flip-flop circuit DF1, respectively, and at the same time are connected to input terminals A1, A2, A3 of a digital comparator DCP1, respectively. What are shown as SW9, SW10, SW11 are switches and the switches SW10, SW11 are respectively connected to a reset terminal and a clock input terminal CP of the flip-flop circuit DF1. Here, the switch SW9 becomes ON when a diaphragm AP is fully opened and becomes OFF at the other times, while the switch SW10 becomes OFF at a time of a single photographing mode and becomes ON at a time of a continuous photographing mode, then the switch SW11 becomes OFF upon a completion of a running of a follower shutter screen, and becomes ON by a completion of a film winding up. The ON-OFF actions of said switch SW10 respectively release a setting of the flip-flop circuit DF1 and resets the same. What is shown as CN2 is an up-down counter, and output terminals Q1, Q2, Q3 of said up-down counter CN2 are connected to input terminals B1, B2, B3 of the digital comparator DCP1. Here, the digital comparator DCP1 has output signals from the output terminals Q1 to Q3 of the adder ADD and output signals from the output terminals Q1 to Q3 of the up-down counter CN2 introduced therein and compares these signals, then, when the signal introduced from the input terminal A side of the digital comparator DCP1 is larger than the signal introduced from the input terminal B side of the same, an output signal from an output terminal A>B of the digital comparator DCP1 attains a high level, then when the input signals from the input terminals A side and B side of the digital comparator DCP1 are at the same level, an output signal from an output terminal A=B attains a high level. AP represents a diaphragm and SM represents a stepping motor, wherein the diaphragm AP is associated with an operation of the stepping motor SM. DR is a driving circuit to drive said stepping motor SM, and said driving circuit DR is constituted with two D-type flip-flop circuits DF2, DF3 and NAND gates N1, N2, N3, N4, N5, N6. What is shown as I1, I2, I3, I4 are inverters, and A4, A5, A6 are AND gates, while O1 is an OR gate, and ON1 is a one shot multi-vibrator. An input side of the inverter I2 is connected to the switch SW5, and as mentioned above a high level signal is introduced into an input side of the inverter I2 before an actuation of a shutter of the camera. An output side of the inverter I2 is connected to the input sides of the AND gates A4, A5, respectively. The output terminal A>B of the digital comparator DCP1 is connected to an input side of the AND gate A5, and the output terminal A=B thereof is connected to an input side of the AND gate A4 through the inverter I1. The pulse generator CG1 is connected also to the input side of the AND gate A4. The output side of the AND gate A3, the above-mentioned switches SW9, SW10 are connected respectively to the input side of the AND gate A6. And a high level signal is to be introduced into the AND gate A6, the inverter I4 when the switch SW9 is OFF, while a low level signal is introduced thereinto when the switch SW9 becomes ON. The switch SW9 is connected through the inverter I4 to the input side of the one shoe multi-vibrator ON1, and the output side of the one shot multi-vibrator ON1 is connected to a reset terminal R of the up-down counter CN2. Each output side of the AND gates A4, A6 are connected to the input side of the OR gate OR1, and the output side of the OR gate O1 is connected to the clock terminal CP of the up-down counter CN2 and at the same time is connected to clock terminals CP of the D-type flip-flop circuits DF2 and DF3 of the driving circuit DR, respectively. The output side of the AND gate A5 is connected to the up-down selection terminal U/D of the up-down counter CN2 and at the same time is connected to two input sides of the driving circuit DR. That is, it is connected to the two input terminals of the same, namely NAND gates N1, N4 of the driving circuit DR to which an output signal RI of the AND gate A5 is introduced as it is, and NAND gates N2, N5 to which a signal LE, inverting the output signal RI through the inverter I3, is introduced. Here the driving circuit DR is so set that every time a clock pulse is introduced into the flip-flop circuits DF2, DF3, when the signal RI being produced from the output terminal A>B of the digital comparator DCP1 and going through the AND gate A5 has a high level the stepping motor SM is driven to the clockwise direction by the circuit DR, while the stepping motor SM is driven to the counterclockwise direction when the inverted signal of the signal RI that is the signal LE which has gone through the inverter I3 has a high level.

The operation of embodiments of the present invention having the above-mentioned arrangements will be described below.

Now, the device shown in FIG. 1 has its power source placed in ON state and the device is in an operative state. There are a single photographing mode and a continuous photographing mode for a photographing state of the device shown therein. Explanation shall be commened with the case of the single photographing mode. Now, since the device is set for a single photographing mode, the switch SW10 is in OFF state, therefore the flip-flop circuit DF1 is reset. Therefore, the signals from the output terminals Q1, Q2, Q3 of the flip-flop circuit DF1 are at a high level. Thus, as mentioned above, during a time of a photometry an aperture information AV having the logarithmically compressed information BV corresponding to an object brightness, the sensitivity information SV, the shutter time information TV operationally processed thereinto is introduced into the analog-digital converter A-D. Further, since the switch SW5 is OFF at this time, a signal of a high level is given to the input side of the AND gate A3, therefore the clock pulses given from the pulse generator CG1 are introduced into the clock input terminal CP of the up-down counter CN1 and are counted, and the output signal of the analog-digital converter is introduced into the adder ADD as it is. Here, since the switch SW5 is in the OFF state before a release action of the camera, that is, during a photometric operation as mentioned above, a high level signal is introduced into the input side of the inverter I2, and, as a result, the AND gate A4 is prohibited from functioning, and prohibiting the clock pulses from the AND gate A4 from being introduced into the stepping motor driving circuit DR. Therefore, the stepping motor SM will not drive and the diaphragm AP will not function. However, if the diaphragm is set at a certain aperture value by some reason such as a shock given to the camera at an initial stage of photometry, the switch SW9 is placed in OFF state, and a high level signal is introduced into the AND gate A6. Also, since the switch SW10 is in the OFF state as it is now in the single photographing mode, a high level signal is introduced into the AND gate A6. And since the switch SW5 is in the OFF state the AND gate A6 produces the clock pulses from the pulse generator CG1 being introduced through the AND gate A3, and gives the clock pulses to the stepping motor driving circuit DR through the OR gate O1. At this time, as it is in a photometric stage, the switch SW5 is in the OFF state as mentioned above, and the outputs of the AND gates A4, A5 are made to have a low level through the inverter I3 into which a high level signal is introduced. Therefore, the output signal LE of the inverter I3 attains a high level, thereby the stepping motor SM rotates to the counterclockwise direction, that is, to fully opening side to return the diaphragm AP to the full-open position. When the diaphragm AP is placed at the full-open position the switch SW9 is placed in ON state by full-open position detecting means (not being shown in the drawing), and the AND gate A6 attains a low level. As a result, the clock pulses from the pulse generator CG1 are prohibited from being introduced into the driving circuit DR, and the stepping motor SM is stopped. When the switch SW9 becomes ON, the output of the inverter I4 being connected thereto attains a high level, and the one shot multi-vibrator circuit ON1 produces a high level signal for a set short period of time to reset the up-down counter CN2. Since the circuit operates to place the diaphragm always at the full-open position during a photometric operation under a single photographing operation, a photometric value by a full-open photometry will be converted analog-digitally. Next, a release button associated with a shutter button (not shown in the drawing) is pressed, a release action of the camera is started, and the switch SW5 becomes ON just before the mirror is up as mentioned above, therefore, the AND gate A3 attains a low level and the clock pulses from the AND gate A3 are prohibited from being introduced into the analog-digital converter A-D, and the up-down counter CN1 memorizes the aperture information AV at the time of full-open photometry. Now, since the switch SW10 is in the OFF state since it is in a single photographing mode and the flip-flop circuit DF1 is reset, said memorized aperture information AV is introduced as it is into the input terminals A1, A2, A3 of the digital comparator DCP1 through the adder ADD. Here, if the memorized aperture information is at a certain value, since the up-down counter CN2 has been reset, the signal introduced into the input terminal A side of the digital comparator DCP1 will be larger than the signal introduced into the input terminal B side thereof, and the signal introduced into the A side and the signal from the output terminal A=B of the digital comparator DCP1 into which the above-mentioned memorized aperture information AV is introduced will have a low level, while the signal from the output terminal A>B becomes to have a high level. Therefore the output signal of the inverter I1 will have a high level, also since the switch SW5 is in the ON state, the output signal of the inverter I2 into which a low level signal is introduced will have a high level, therefore the clock pulses from the pulse generator CG1 are introduced into the stepping motor driving circuit DR through the AND gate A4, the OR gate O1. At this time, since the output signal RI of the AND gate A5 has a high level, the driving circuit DR into which the high level output signal RI is introduced will operate so as to rotate the stepping motor SM in the clockwise direction. Therefore, the diaphragm AP starts to stop down. Also the high level output signal of the AND gate A5 is introduced into the up-down counter selection input terminal U/D of the up-down counter CN2 to select the up-down counter CN2 to make an up count, and the up-down counter CN2 up counts the input of the clock pulses from the pulse generator CG1 through the OR gate O1. Thus, the up-down counter CN2 up counts said clock pulse input in synchronism with the stopping down by the diaphragm AP, and the output signal therefrom is introduced from the output terminals Q1, Q2, Q3 into the input terminals B1, B2, B3, respectively of the digital comparator DCP1. And when the output signal being introduced from the output terminals Q1, Q2, Q3 of the adder ADD into the input terminals A1, A2, A3 of the digital comparator DCP1 respectively and the above-mentioned output signal from the up-down counter CN2 coincides with each other at the digital comparator DCP1, the output signal from the output terminal A=B of the digital comparator DCP1 attains a high level. This high level output signal is made into a low level through the inverter I1 and as a result, the AND gate A4 into which this low level signal is introduced will be prohibited from functioning. Also, since the AND gate A6 is prohibited from functioning at this time, the introduction of the clock pulses from the pulse generator CG1 into the stepping motor driving circuit DR through the OR gate O1 is prohibited. Therefore, the diaphragm AP is fixed at the memorized aperture value and is entered into a next shutter operation. Also a shutter operation at this time is performed in an electrical or a mechanical manner, but as it can be performed by known techniques, explanations therefor will be omitted.

And as a shutter operation is completed, the mirror is held down and the switch SW5 is placed in OFF state. After the switch SW5 is made OFF, such operations as mentioned above for during a photometric action will be carried out, and the clock pulses from the pulse generator CG1 and the signal LE will be added to the stepping motor driving circuit DR, and the stepping motor SM rotates to the counterclockwise direction, then the diaphragm AP is operated to the full-open position. And when the diaphragm AP is fully opened, that is as the full-open position is secured, the switch SW9 becomes ON and the clock pulses from the pulse generator CG1 are prohibited from being introduced into the driving circuit DR, and the up-down counter CN2 is reset.

Next, explanations shall be made on a continuous photographing mode.

Since the switch SW10 becomes ON in a continuous photographing mode, the resetting of the flip-flop DF1 is released. Now, if it is supposed that a setting of a continuous photographing mode is performed during a photometric operation, the signal by the switch SW11 will not show a rise regardless of the completion or incompletion of a film wind up, therefore the output signal from the output terminals Q1, Q2, Q3 of the flip-flop circuit DF1 remains at a low level, and the circuit operations at a time of a first release after the continuous photographing mode is set will be the same as in the case of the single photographing mode mentioned above. When a first photographing after the continuous photographing mode is set is finished and the follower screen of the shutter completes its running, the switch SW11 is placed in OFF state, therefore the flip-flop DF1 is triggered, then at this time, the output signal from the output terminals Q1, Q2, Q3 of the adder ADD which is same information as the aperture information AV memorized at the up-down counter CN1 and produced at its output terminals A, B, C will be memorized at the output terminal side Q1, Q2, Q3 of the adder ADD through the input terminals D1, D2, D3 of the flip-flop circuit DF1. And, even if the mirror is held down and the switch SW5 is made OFF upon completion of the shutter follower screen running, the switch SW10 is retained in the ON state as it is in the continuous photographing mode. Therefore, the AND gate A6 is prohibited from functioning and the clock pulses from the pulse generator CG1 for returning the diaphragm AP to the full-open position will not be added to the stepping motor driving circuit DR. As a result, at a time of the second photometry, the photometry is performed in a state in which the stop down to an operated aperture value was performed in the first photometry, and an operated value of logarithmically compressed information BV−aperture value information AV+film sensitivity information SV−shutter time information TV will apear at the output side of the operational amplifier OP2.

Here, when an object brightness in the first phototaking and that in the second phototaking are same, since the aperture value AV in the first time has been memorized in the flip-flop circuit DF1, the adder ADD produces, in such procedure as has been mentioned above, (logarithmically compressed information BV−aperture information AV+film sensitivity information SV−shutter time information TV)+aperture information AV=logarithmically compressed information BV+film sensitivity information SV−shutter time information TV, that is the aperture information AV.

At this time, since a number of steps by which the stop down has been performed, that is, the aperture information AV is memorized in the up-down counter CN2, the output signal from the adder ADD and the output signal from the up-down counter CN2 are exactly same, and the above-mentioned output signal from the output terminal A=B of the digital comparator DCP1 becomes to have a high level as mentioned above. As a result, the operating signal will not be introduced into the stepping motor driving circuit DR in the second stop down operation, therefore the stepping motor will not be operated and the same aperture information as in the first time will be obtained.

Next, explanation will be made in a case where the object brightness is different the second time from that during the first time.

If the object brightness during the second time is to be expressed by BV′, the operated value of (logarithmically compressed information BV′−aperture information AV+film sensitivity information SV−shutter time information TV) will appear at the output side of the operational amplifier OP2. Also, since the aperture information AV of the first time has been memorized in the flip-flop circuit DF1, the adder ADD will produce, as mentioned above, (logarithmically compressed information BV′−aperture information AV+film sensitivity information SV−shutter time information TV)+aperture information AV=logarithmically compressed information BV′+film sensitivity information SV−shutter time information TV, that is the second time aperture information AV′. At this time when the aperture information AV′ at the second time is larger than the aperture information AV in during the first time, that is, when it is at a stop down side, the signal from the output terminal A>B of the digital comparator DCP1 attains a high level, and, at the time the switch SW5 is ON, that is, at the time of mirror up, the output signal of the inverter I2 will have a high level, therefore the output signal RI of the AND gate A5 will have a high level. Also, the output signal from the output terminal A=B of the digital comparator DCP1 will have a low level, the output signal of the inverter I1 attains a high level. Therefore, the clock pulse from the pulse generator CG1 is introduced into the stepping motor driving circuit DR from the AND gate A4 into which the signal of high level is introduced from the inverters I1, I2, therefore, the stepping motor SM rotates to the clockwise direction. At the same time, the up-down counter CN2 into which the high level signal is introduced to the up-down selection input terminal U/D of the up-down counter CN2 from the AND gate A5 begins up count with the input of the clock pulses from the AND gate A4 through the OR gate O1. Said up count will be performed in accordance with the difference of the first time aperture information AV and the second time aperture information AV′, that is, until a coincidence with the output signal from the adder ADD is secured, and the stepping motor will rotate during said period of time and the diaphragm AP will be stopped down. And, when the stepping motor has rotated as much as the difference between the aperture information AV′ and the aperture information AV, that is, when the output signal from the adder ADD and the counted output from the up-down counter CN2 coincide with each other, the signal from the output terminal A=B of the digital comparator DCP1 will have a high level. Therefore, the AND gate A4 is prohibited from functioning through the inverter I1, also since the output signal of the AND gate A6 has been prohibited from functioning at this time, the clock pulses from the pulse generator CG1 will not be introduced into the driving circuit DR through the OR gate O1, thus the stepping motor SM is stopped and the stop down of the second time aperture information AV′ will be performed.

Also, when the second time aperture information AV′ is, smaller than the first time aperture information AV, that is when it is at a full-opening side, the signal from the output terminal A>B of the digital comparator DCP1 is so set as will have a low level, therefore, the output signal of the AND gate A5 will have a low level. Therefore, the output signal LE of the inverter I3 will have a high level, and the stepping motor rotates to the counterclockwise direction, that is, the diaphragm will be operated to the full-open direction, and at this time, the up-down counter CN2 performs down count. And when the stepping motor SM operates as much as the difference between the first time aperture information AV and the second time aperture information AV′, that is, when the up-down counter CN2 makes the down count as much as said difference, the signal from the output terminal A=B of the digital comparator DCP1 attains a high level, and as has been mentioned above, the clock pulses are prohibited from being introduced into the driving circuit DR by the AND gate A4, and the diaphragm AP is opened to the full-open side, and the stop down of the second time aperture information AV′ has been completed.

When the second time aperture has been determined and the shutter is operated, the switch SW11 becomes OFF upon completion of the running of the follower shutter screen, therefore, the flip-flop circuit DF1 is triggered and the second time aperture information AV′ is memorized in the flip-flop circuit DF1 and is produced. Therefore, in the third time phototaking, photometry is performed under the second time stopped down state retained as it is and memorizing is performed in the same manner and a control can be made in the same manner.

Next, another example of the present invention in which a physical diaphragm such as liquid crystal, etc. is used in place of a diaphragm mechanism using a stepping motor will be explained referring to the drawing attached.

Here, since the other portion than the portion X encircled by chain line in FIG. 1 is the same, FIG. 2 has the same portion omitted. That is, in this example of the present invention, the control circuit diagram of the physical diaphragm shown in FIG. 2 is used in the portion X encircled by the chain line in FIG. 1. Here in FIG. 1 and in FIG. 2, the same parts have the same identifying numbers.

In FIG. 2, the input terminals A1, A2, A3 of the digital comparator DCP1 are respectively connected to the output terminals Q1, Q2, Q3 of the adder ADD in the same manner as in the above-mentioned example. The output terminals Q1, Q2, Q3 of the up-down counter CN2 are connected to the input terminals B1, B2, B3 of the digital comparator DCP1 and, at the same time, are connected to the input terminal of a decoder DEC. The output terminal A>B of the digital comparator DCP1 is connected to the input of the AND gate A5, and the output terminal A=B of the digital comparator DCP1 is connected to the input terminal of the AND gate A4 through the inverter I1. The switch SW5 is connected to the inverter I2, and the output terminal of said inverter is connected respectively to the input terminals of the AND gates A4, A5. Further, the pulse generator CG1 is connected to the input terminal of the AND gate A4. The output terminals of the AND gates A4, A5 are connected respectively to the clock terminal and the up-down selection terminal of the up-down counter CN2. The switch SW5, and the switch SW10 are connected to an input terminal of an AND gate A7, and the output terminal thereof is connected to a reset terminal of the up-down counter CN2. Also, output terminals Q0 to Q7 of the decoder DEC are connected to a selection circuit RM and the outputs thereof are connected to a liquid crystal driving circuit LDR through segment output terminals S1 to S7. An output terminal of the driving circuit LDR is connected to an input terminal of a diaphragm LAP.

Operation of this embodiment of the present invention having the above-mentioned example will be briefly explained.

First, explanation will be made for the case of a single photographing mode. Since the memorizing switch SW5 which becomes ON just before mirror up is in OFF state during a photometry and the switch SW10 which becomes ON at a time of a continuous photographing mode is also in OFF state, an output signal of the AND gate A7 has a high level. As a result, this high level signal is introduced into the reset terminal of the up-down counter CN2, and the up-down counter CN2 is placed in a reset state, and the output signal of the decoder DEC connected to the output terminals Q1, Q2, Q3 of the up-down counter CN2 will have only Q0 to become high level, therefore the selection circuit RM will not select any one of the output terminals S1 to S7. As a result, any one of the segments will not be operated in the liquid crystal driving circuit LDR. That is, a diaphragm LAP will be placed in a full-open position. When release action of the camera is started after a photometry is done at a full-open position as mentioned above, the switch SW5 becomes ON just before the mirror up, therefore, the resetting of the up-down counter CN2 is released, and the clock pulses from the pulse generator CG1 are added to the up-down counter CN2 through the AND gate A4. And the aperture information memorized by the digital comparator DCP1 and the counted value by the up-down counter CN2 are compared and when they coincide with each other, the signal from the output terminal A=B of the digital comparator DCP1 attains a high level, therefore, the AND gate A4 attains a low level, and as a result, the clock pulses from the pulse generator CG1 are prohibited from being introduced into the up-down counter CN2 as in the above-mentioned case.

Now, when it is supposed that the signals from the output terminals Q1, Q2, Q3 of the up-down counter CN2 are respectively at a high level, a high level and a low level at that time, the output signal from the output terminal Q3 only at the decoder DEC will have a high level, and the segment outputs from the segment output terminals S1, S2, S3 at the selection circuit RM will have a high level as shown in the drawing, the diaphragm LAP will be stopped down by three steps from the full-open position by a predetermined driving operation of the liquid crystal driving circuit LDR.

When the shutter control is completed and the mirror makes up movement again, the switch SW5 becomes OFF, therefore the output signal of the AND gate A7 attains a high level. As a result, the up-down counter CN2 is reset again and the diaphragm LAP is returned to the full-open position again.

Next, explanation shall be made relating the case of continuous photographing. Since the switch SW10 is ON in a continuous photographing mode, the resetting of the up-down counter CN2 is released, and the diaphragm will not return to the full-open position every time a photographing is completed, instead a diaphragm aperture control will be made in an exactly same manner as in the case of FIG. 1.

Figure 3:
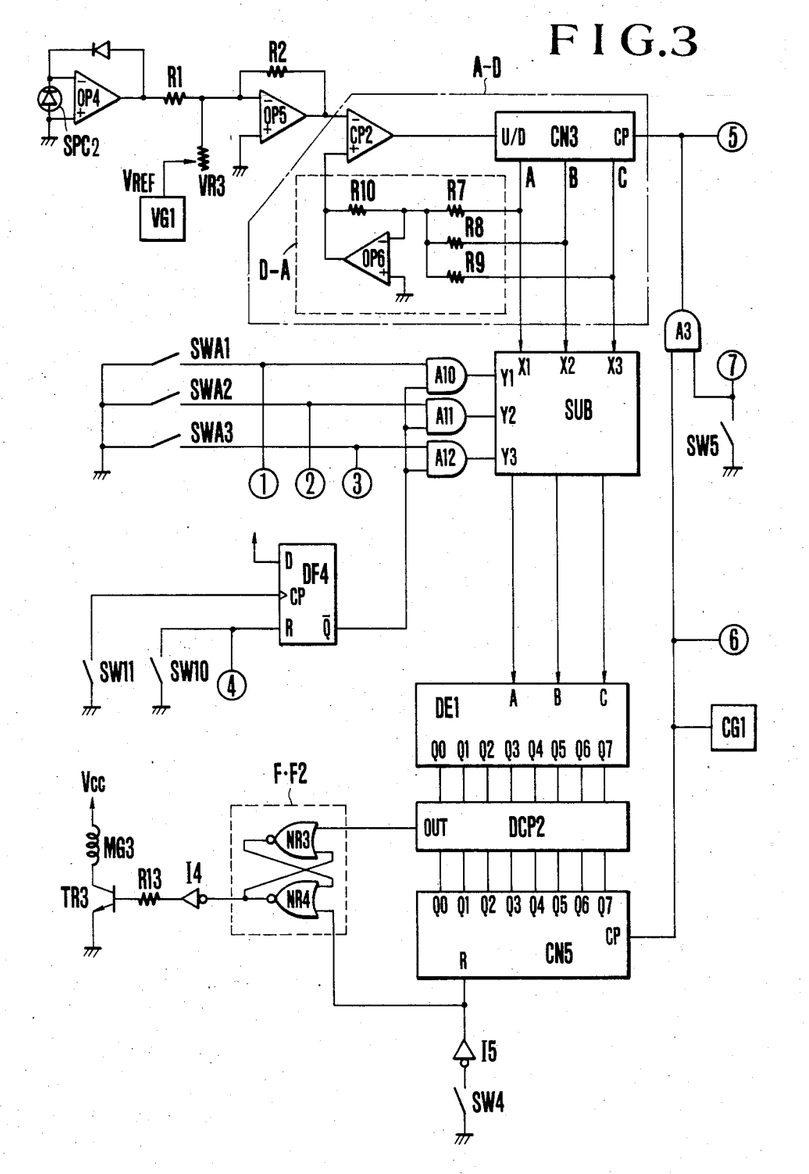
FIG. 3 is a shutter control circuit.
Figure 4:
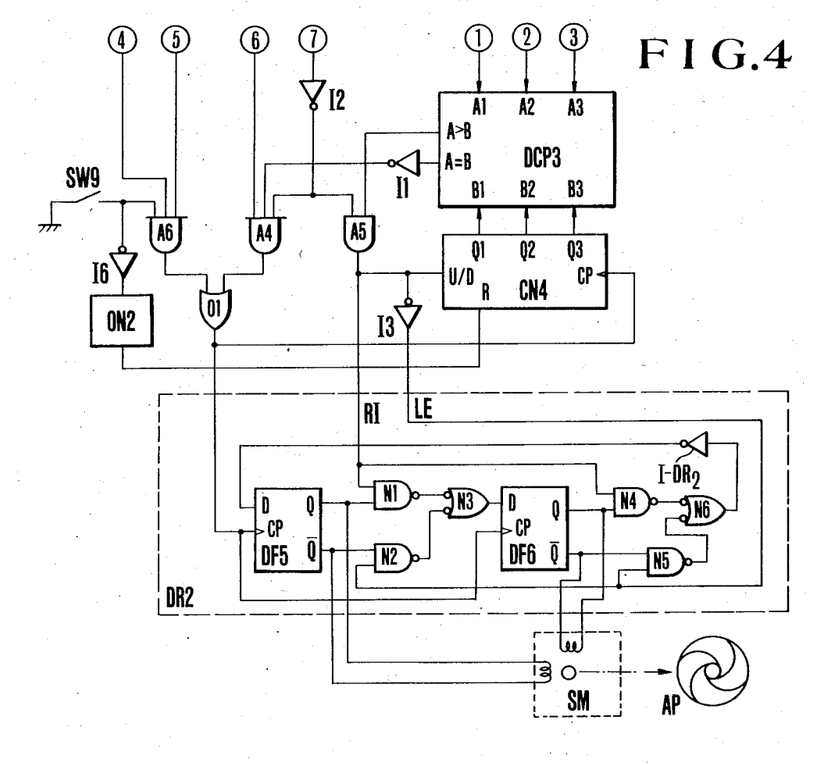

FIG. 3 is a shutter control circuit diagram in an example of the present invention, and FIG. 4 is a diaphragm aperture control circuit diagram of an example of the present invention being coupled to the shutter control circuit diagram of FIG. 3.

In FIG. 3, what is shown as OP4 is an operational amplifier with a high impedance input, and a light receiving element SPC is connected to an input side of said operational amplifier OP4, while a compression diode D2 is provided at a feedback path thereof. By this circuit arrangement, logarithmically compressed information BV is produced as a voltage in correspondence to an object brightness at an output side of the operational amplifier OP4.

The output side of the operational amplifier OP4 is connected to an inverted input terminal side of an operational amplifier OP5 through a resistor R1, and a non-inverted input terminal side of the operational amplifier OP5 is grounded. What is shown as VG1 is a constant voltage source and a constant voltage $V_{REF}$ of this constant voltage source VG3 is given to a sliding piece of a variable resistor VR3, and said sliding piece is connected to the inverted input terminal side of the operational amplifier OP5. Also, the operational amplifier OP5 has a resistor R2 provided at its feed back path, and the above-mentioned logarithmically compressed information BV and film sensitivity information SV being introduced through a variable resistor VR3 from a setting member not being shown in the drawing are introduced into said operational amplifier OP5, and exposure information $EV=BV+SV$ is operationally processed. Therefore, an APEX value of the exposure information is produced at the output side of the operational amplifier OP2 in an inversely proportional relationship with the voltage of the exposure information EV.

What is shown as CP2 is a comparator, and the output side of the operational amplifier OP5 is connected to an inverted input terminal side of said comparator CP2, and the output side thereof is connected to a selection terminal for up-down of an up-down counter CN3. Output terminals A, B, C of the up-down counter CN3 are connected to a resistor R10 through resistors R7, R8, R9, respectively, and are at the same time, connected to an inverted input terminal side of an operational amplifier OP6. The resistor R10 is connected to a non-inverted input terminal side of the comparator CP2 and an output side of the operational amplifier OP6 is connected to the non-inverted input terminal side of the comparator CP2. A non-inverted input terminal side of the operational amplifier OP6 is grounded. Here, the resistors R7, R8, R9 have such resistance values set respectively therein as forming multiple series, and such arrangement is made that voltages corresponding to digital values of the output terminals A, B, C are formed at the output side of the operational amplifier OP6 in such relationship as inversely proportional to the digital values thereof. And the resistors R10, R7, R8, R9 and the operational amplifier OP6 constitute a digital-analog converter D-A, and said digital-analog converter D-A and the comparator CP2 as well as the up-down counter CN3 constitute an analog-digital converter A-D. The pulse generator CG1 is connected through the AND gate A3 to a clock terminal CP of the up-down counter CN3 of said analog-digital converter A-D, so that clock pulses will be introduced thereinto. Further, the switch SW5 is connected to the AND gate A3 and said switch SW5 is placed in OFF state before a shutter actuation of the camera, and a high level signal is introduced into the AND gate A3. In this circuit arrangement, the comparator CP2 compares the output signal of the operational amplifier OP5 and the output signal of the operational amplifier OP6, then if the output signal, for example a voltage of the operational amplifier OP6 is higher than the output signal of the operational amplifier OP5, for example a voltage, the output signal of the comparator CN2 attains a high level, and said high level output signal so select the up count/down count selection terminal of the up-down counter CN3 to operate the same to make up count, and contrary thereto, when the output signal of the operational amplifier OP6 is lower than the output signal of the operational amplifier OP5, the output signal of the comparator CP2 attains a low level, then said low level output signal so select the up count/down count selection terminal of the up-down counter CN3 as to have the same to make doun count, being contrary to the above case. Therefore, the output terminals A, B, C of the up-down counter, that is, the output side of the analog-digital converter A-D will have the analog output signals of the operational amplifier OP5 converted to the signals of digital values.

What is shown as SUB is a subtractor, and the above-mentioned output terminals A, B, C of the up-down counter CN3 are connected to input terminals X1 to X3 at one side of said subtractor SUB, while switches SWA1, SWA2, SWA3 are connected through AND gates A10, A11, A12 to input terminals Y1 to Y3 at the other side of the same. Said switches SWA1, SWA2, SWA3 are to be opened and closed by a diaphragm aperture setting member not being shown in the drawing, and digital value of an aperture value AV determined by said opening and closing is introduced into the subtractor SUB. At this subtractor SUB, an operation of the information EV-AV, and shutter time information TV will be produced at an output side thereof. Further, $\overline{Q}$ output terminal of a D-type flip-flop circuit DF4 is connected to input terminal sides of the AND gates A10, A11, A12. What are shown as SW10, SW11 are similar switches as shown in the first example, and the switch SW10 is made OFF at a time of a single photographing mode and is made ON at a time of a continuous photographing mode, while the switch SW11 is made OFF upon completion of a running of a follower shutter screen and is made ON upon completion of a film wind up. And the output signal of the $\overline{Q}$ output terminal of the flip-flop circuit DF4 are changed over to a low level and a high level by said ON.OFF action of the switch SW10.

What is shown as DE1 is a 3-line-8-line decoder, and the shutter time information TV from the subtractor SUB is introduced into input terminals A, B, C of said decoder DE1 to produce a high level signal at one of output terminals Q0 to Q7 thereof. DCP2 is a digital comparator, CN5 is a binary counter, and F·F2 is a flip-flop circuit, wherein the digital comparator DCP2 has the output signals from the output terminals Q0 to Q7 of the decoder DE1 and the output signals from output terminal Q0 to Q7 of the binary counter CN5 introduced thereinto, and when these signals become equal to each other a high level signal is produced at the flip-flop circuit F·F2 comprising two NOR circuits NR3, NR4. Also the pulse generator CG1 is connected to the clock terminal CP of the binary counter CN5. What is shown as SW4 is a switch for count starting of the binary counter CN5 to be made OFF as a leading screen of shutter starts running, and is connected to a reset terminal of the binary counter CN5 through the inverter I5 and at the same time connected to an input side of the flip-flop circuit F·F2. Also, it is arranged that when a high level signal is introduced into the input side of the inverter I5 at a time the switch SW4 is OFF and the switch SW4 is made ON, a signal of low level will be introduced into the input side of the inverter I5. The output side of the flip-flop circuit F·F2 is connected to a base side of a transistor TR3 through an inverter I4 and a resistor R13 in turn. A collector side of the transistor TR3 is connected to a power source Vcc through a magnet MG3 for retaining the follower shutter screen, while an emitter thereof is grounded.

Next explanation shall be made with respect to the diaphragm aperture control circuit in FIG. 4.

Here, connecting line with FIG. 3 is represented in FIG. 4 by 1 to 7. In FIG. 4, what is shown as DCP3 is a digitial comparator, and input terminals A1, A2, A3 of said digital comparator DCP3 are connected to switches SWA1, SWA2, SWA3, respectively. What is shown as CN4 is an up-down counter, and output terminals Q1, Q2, Q3 of this up-down counter CN4 are connected to input terminals B1, B2, B3 of the digital comparator DCP3. The digital comparator DCP3 is to compare an aperture information AV from a diaphragm aperture setting member (not being shown in the drawing) and information from output terminals Q1, Q2, Q3 of the up-down counter CN2 by the switches SWA1, SWA2, SWA3, wherein when an A input of the digital comparator DCP2 is larger than a B input thereof, a high level signal is produced at A>B terminal, while when the A input and the B input are equal, a high level signal will be produced at A=B terminal. AP is a diaphragm and SM is a stepping motor, wherein the diaphragm AP is associated with the operation of the stepping motor SM. DR2 is a driving circuit to drive said stepping motor and this driving circuit DR2 is made of two D-type flip-flop circuits DF5, DF6, and six NAND gates N1, N2, N3, N4, N5, N6. Said driving circuit DR2 is so set that every time clock pulses are entered into the flip-flop circuits DF5, DF6, when the signal RI through an AND gate A5 to be described later from the output of the digital comparator DCP3 is at a high level, the circuit DR2 drives the stepping motor SM to the clockwise direction, and when the inverted signal of RI that is the signal LE through the inverted I3 is at a high level said circuit DR2 drives the stepping motor SM to the counterclockwise direction. What are shown as I1, I2, I3, I6 are inverters, and A4, A5, A6 and AND gates, while O1 is an OR gate, and ON1 is one shot multivibrator. An input side of the inverter I2 is connected to the switch SW5, and a high level signal is introduced into an input side of the inverter I2 before a shutter actuation of the camera. An output side of the inverter I2 is connected to input sides of the AND gates A4, A5, respectively. The A>B terminal of the digital comparator DCP2 is connected to an input side of the AND gate A5, while the A=B terminal thereof is connected to the input side of the AND gate A4 through the inverter I1. Further the pulse generator CG1 is connected to the input side of the AND gate A4. The output side of the AND gate A3, the switches SW9 and SW10 are connected respectively to the input side of the AND gate A6. Here, the switch SW9 is to be placed in ON state when the diaphragm AP is fully opened. The switch SW9 is connected to the input side of the one shot multivibrator ON1 through the inverter I6, and the output side thereof is connected to the reset terminal of the up-down counter CN4. Also, such arrangement is made that when the switch SW9 is made OFF, high level signals are introduced into the AND gate A6 and the inverter I6, while as the switch SW9 is made ON, low level signals are to be introduced thereinto, being contrary thereto. Each of the output sides of the AND gates A4, A6 is connected to the input side of the OR gate O1, and the output side of the OR gate O1 is connected to the clock terminal of the up-down counter CN4 and at the same time is connected to the clock terminal CP of the D-type flip-flop circuits DF5, DF6 of the driving circuit DR2. The output side of the AND gate A5 is connected to the up-down selection terminal of the up-down counter CN4 and at the same time is connected to two input sides of the driving circuit DR2. That is, it is connected to two input terminals, i.e., the NAND gates N1, N4 of the driving circuit to which the output signal RI of the AND gate A5 is introduced as it is, and the NAND gates N2, N5 into which the signal LE which is the output signal RI thereof being inverted in the inverter I3 is introduced.

Operations of the example of the present invention having the above-mentioned arrangement shall be explained below.

Now the device shown in FIG. 3 and FIG. 4 has its power source placed in ON state and is in an operative state. While there are a single photographing mode and a continuous photographing mode for the phototaking state at this time, first explanations will be made on the single photographing mode. Now since it is in a single photographing mode, the switch SW10 is in OFF state, therefore the flip-flop circuit DF4 has been reset. Therefore, the $\overline{Q}$ output signal of the flip-flop circuit DF4 is at a high level. Also, since the digital value of the aperture value AV is introduced into the AND gates A10, A11, A12 corresponding to an opening and closing of the switches SWA1, SWA2, SWA3, therefore the output signals of the AND gates A10, A11, A12 will correspond to the aperture information AV being set by the switches SWA1, SWA2, SWA3. Therefore, the exposure information EV having the logarithmically compressed information BV corresponding to an object brightness and the set information SV added together will be introduced into the analog-digital converter A-D, further the output signal obtained by signal processing of the pulse signal being given from the pulse generator CG1 is introduced into the subtractor SUB, and in this subtractor SUB an operation of the exposure information EV-aperture information AV is made to produce the shutter time information TV at the output terminal of the subtractor SUB. When the release button is further pressed down under a state in which an already photographed film is wound up, a release action of the camera is started in a known manner, and in the case of a single lens reflex camera, a stop down of a camera and a mirror up will be started. However, at this time, since the switch SW5 is closed just before the release action, therefore the output signal of the AND gate A3 becomes to have a low level, and as a result, the introduction of the clock pulses from the pulse generator CG1 into the up-down counter CN3 is stopped and the analog-digital conversion information is memorized in the up-down counter CN3. This information is converted to the shutter time information TV through the subtractor SUB as mentioned above. Said shutter time information TV is produced at the input terminals A, B, C of the decoder DE1, and any one of the output signals from the output terminals Q0 to Q7 becomes to have a high level, and said signal is produced at the digital comparator DCP2.

When a sequence (operation) of the camera further proceeds and a stop down is performed then the mirror is completely up, the leading screen of the shutter starts running. At this time, the switch SW4 is made OFF. Therefore, a low level signal will be introduced into the reset input terminal R of the binary counter CN5, and the resetting of the binary counter CN5 is released. As a result, since the clock pulses from the pulse generator CG1 have been given to the clock input terminal CP of the binary counter CN3, the binary counter CN5 starts counting said pulses. And the digital comparator DCP2 into which the output signals from the output terminals Q0 to Q7 of the binary counter CN3 produces a high level signal from its output terminals to the flip-flop circuit F·F2 when the above-mentioned output signals become equal to the output signals from the output terminals Q0 to Q7 of the decoder DE1. When this high level signal is introduced into the flip-flop circuit F·F2, the flip-flop circuit F·F2 is reset to invert the output signals of low level theretofore and high level signal will be produced. Thus, high level signal will be made into low level by the inverter I4 to change over the transistor TR3 from the ON state to which it has been maintained to OFF state. As a result, a power supply to the follower shutter screen retention magnet MG3 is released and a follower shutter screen not being shown in the drawing runs. By this operation, the shutter time information TV being analog-digital converted is actually extended, thus the shutter will be controlled.

An explanation shall be made on the diaphragm aperture control circuit in FIG. 4. Since the switch SW5 is turned OFF before the release action of the camera that is during photometry, high level signal will be introduced in the input terminal of the inverter I2, as a result the AND gate A4 is prohibited from functioning, and the introduction of the clock pulses from the AND gate A4 into the stepping motor driving circuit DR will be prohibited. Therefore, the stepping motor will not be driven and the diaphragm will not work. However, when the diaphragm AP has a certain aperture value by some reason such as a vibration of camera, etc. at an initial stage of a photometry, the switch SW9 is made OFF and high level signal will be introduced into the AND gate A6. Also, since the switch SW10 is made OFF as it is in a single photographing mode, high level signal will be introduced into the AND gate A6. As a result, the AND gate A6 produces the clock pulses from the pulse generator CG1 being introduced through the AND gate A3, therefore, the clock pulses are given to the stepping motor driving circuit DR through the OR gate O1. At this time, since it is during photometry that the switch SW5 is made OFF, and the output of the AND gate A5 is made to have a low level through the inverter I2 into which the high level signal is introduced. Therefore, the output signal LE of the inverter I3 attains a high level. By this, the stepping motor SM rotates to the counterclockwise direction to return the diaphragm to the full-open position. When the diaphragm AP comes to the full-open position, the switch SW9 becomes ON by full-open position detecting means not being shown in the drawing, and the AND gate A6 will have a low level. As a result, the introduction of the clock pulses from the pulse generator CG1 into the driving circuit DR2 is prohibited, and the stepping motor SM is stopped. When the switch SW9 is made ON, the output of the inverter I6 being connected thereto will have a high level, and the one shot multi-vibrator circuit ON2 produces high level signal for a set short period of time to reset the up-down counter CN4. Since the circuit is operated in a manner so as to always place the diaphragm in the full-open position during a photometry in the single photographing mode as mentioned above, a photometric value by a full-open photometry will be analog-digitally converted. And when a release action is performed, the switch SW5 is made ON just before the mirror is made up as mentioned above the output signal of the inverter I2 will have a high level. Now, it is supposed that the set aperture value AV is at a certain value, since the up-down counter CN4 has been reset, the signal from the A=B terminal of the digital comparator DCP3 will have a low level, while the signal from the A>B terminal will have a high level. As a result, the output signal of the inverter I1 will have a high level, and the output signal of the inverter I2 also has a high level, therefore, the clock pulses from the pulse generator CG1 will be introduced into the stepping motor driving circuit DR2 through the AND gate A4 and the OR gate O1. Since the output signal RI of the AND gate A5 also will have a high level, the driving circuit DR2 is operated so as to rotate the stepping motor to the clockwise direction. Therefore, the diaphragm AP starts opening. Also, the output signal at high level of the AND gate A5 is introduced into the up-down selection input terminal U/D of the up-down counter CN4 and so select the same as up counter the up-down counter CN4, and the up-down counter CN4 makes up count by the input of the clock pulses from the OR gate O1. The up-down counter CN4 makes up count in synchronism with the stopping down of the diaphragm AP, and at a time when the count value of the up-down counter CN4 and the information of the aperture setting input signal from the switches SWA1 to SWA3 coincide with each other, the output signal from the output terminal A=B of the digital comparator DCP2 will have a high level. This output signal of high level prohibits the AND gate A4 from functioning through the inverter I1, and the introduction of the clock pulses into the stepping motor driving circuit DR2 is prohibited. Therefore, the diaphragm AP is fixed at a set aperture value and is entered into a next shutter control. Here, the shutter control is made to count the clock pulses introduced from the pulse generator CG1 by the binary counter CN5 until the set aperture value becomes equal to the operated shutter time information TV by the switch SW4 associated with a running start of the leading shutter screen, then upon completion of the counting a power supply to the magnet MG3 is cut off for running the follower shutter screen. When the shutter operation is completed, the mirror is held down and the switch SW5 is made OFF. After the switch SW5 is made OFF, operations during a photometry as described before will be made, and the clock pulses and the LE signal are given to the stepping motor driving circuit DR2, and the stepping motor SM rotates to the counterclockwise direction and the diaphragm AP is operated to the direction of the full-open position. And when the diaphragm AP is fully opened, that is when it is placed in a fully opened position, the switch SW9 becomes ON to prohibit the introduction of the clock pulses, for resetting the up-down counter CN4.

Next, explanation will be made concerning continuous photographing.

Since the switch SW10 has been in ON state in the continous photographing mode, the resetting of the flip-flop DF4 is released. Now the case when a setting of a continuous photographing mode is performed during photometry is discussed. The signal will not rise by the switch SW11 regardless of completion and incompletion of a film wind up, therefore, the output signal from the $\overline{Q}$ terminal of the flip-flop circuit DF4 will remain at a high level, and the rotation operation at the first release action after the continuous photographing mode is set will be performed the same manner as in the case of the above-mentioned single photographing mode. When the first photographing after the continuous photographing mode is set is completed and the running of the follower shutter screen is completed, the switch SW11 is made OFF, therefore the flip-flop DF4 is triggered and the output signal from the $\overline{Q}$ terminal of the flip-flop DF4 becomes to have a low level. Therefore, the AND gates A10, A11, A12 will be prohibited from functioning and the input signals to the input terminals Y1, Y2, Y3 of the subtractor SUB will all have a low level. And, even after the mirror is held down and the switch SW5 is made OFF after the running of the follower shutter screen is completed, the continuous photographing mode is left as it is set, therefore the switch SW10 is left in ON state. Therefore, the AND gate A6 is prohibited from functioning and the clock pulses to return the diaphragm AP to a full-open position will not be added to the stepping motor driving circuit DR2. As a result, photometry for the second photographing will be performed in a state where the stop down has been performed with the operated aperture value by the full-open photometry in the first photographing, and an operated value of the logarithmically compressed information BV—aperture information AV+set information SV will appear at the output terminal of the operational amplifier OP5. And since the analog signal of said operational amplifier OP5 is analog-digitally converted at the analog-digital converter A-D, the converted digital information will be produced at the output terminals A, B, C of the up-down counter CN3. At the subtractor SUB to which said digital information is introduced, since the input signals at the input terminals Y1 to Y3 thereof are at a low level as mentioned above, the output signal of the subtractor SUB will have the above-mentioned analog-digitally converted result as it is, that is the information of the logarithmically compressed information BV—aperture information AV+set information SV being produced thereat by subtracting "0".

Since this information is to indicate the appropriate shutter time information TV, an automatic exposure with a stopped down aperture perference will be performed by making a shutter control in the same manner as in the case of the abovementioned single photographing mode.

Also, since the clock pulses are not introduced into the stepping motor driving circuit DR in succeeding photographings in a continuous photographing mode, the diaphragm AP will have the set stopped down value retained as it is, and an automatic exposure of the shutter only will be performed as mentioned above.

Next, an example of the present invention in which a physical diaphragm such as a liquid crystal device etc. is used in place of a diaphragm mechanism using a stepping motor shall be explained referring to the drawing.

Figure 5:
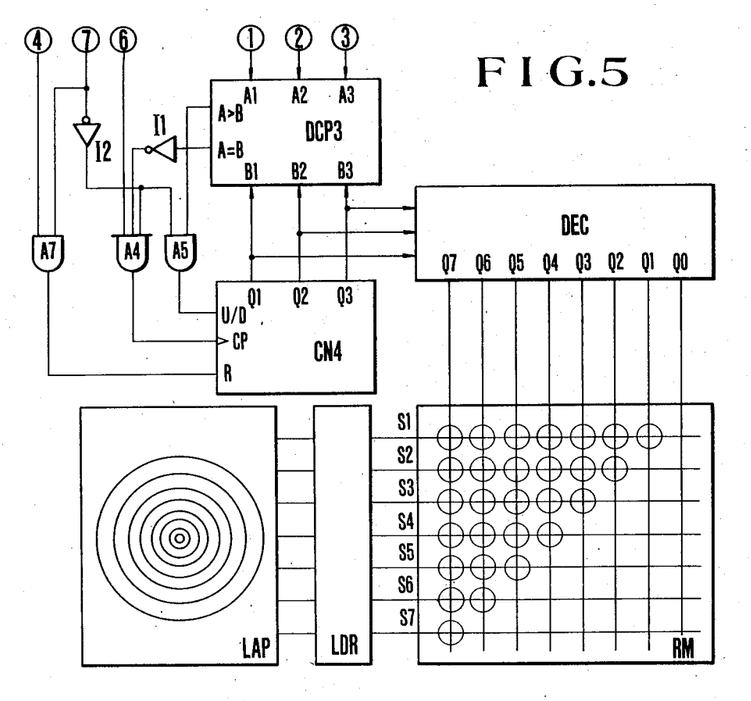
FIG. 5 is a diaphragm control circuit, using liquid crystal.

The portion of the shutter control circuit in FIG. 3 is the same. A control circuit with a physical diaphragm as shown in FIG. 5 is used in this example in place of such diaphragm control circuit as shown in FIG. 4 mentioned above. And the same components in the diaphragm control circuit in FIG. 5 as those in the diaphragm control circuit in FIG. 4 are identified with the same numbers.

Now, the connecting line between FIG. 5 and FIG. 3 are shown by (1) to (3), (4), (6) and (7).

In FIG. 5, the input terminals A1, A2, A3 of the digital comparator DCP3 are connected to the switches SWA1, SWA2, SWA3 respectively. The output terminals Q1, Q2, Q3 of the up-down counter CN4 are connected to the input terminals, B1, B2, B3 of the digital comparator DCP3, and are at the same time connected to the input terminal of the decoder DEC. The A>B terminal of the digital comparator DCP3 is connected to the input terminal of the AND gate A5, while the A=B terminal thereof is connected to the input terminal of the AND gate A4 through the inverter I4. The switch SW5 is connected to the inverter I2, and the output terminal thereof is connected to the input terminals of the AND gates A4, A5, respectively. Further, the pulse generator CG1 is connected to the input terminal of the AND gate A4. The output terminals of the AND gates A4, A5 are connected, respectively, to the clock terminal and the up-down selection terminal of the up-down counter CN4. The switches SW5, SW10 are connected to the input terminals of the AND gate A7, and the output terminal thereof is connected to the reset terminal of the up-down counter CN4. Also the output terminals Q0 to Q7 of the decoder DEC are connected to the selection circuit RM and the output thereof is connected to the liquid crystal driving circuit LDR through the segment output terminals S1 to S7. The output terminal of the driver circuit LDR is connected to the input terminal of the diaphragm LAP.

Now, explanations shall be made concerning operation of the example shown in FIG. 5 having an arrangement as mentioned above shall be made.

First, explanation shall be made concerning a case of a single photographing mode. Since the memory switch SW5 which becomes ON just before a mirror up is left in OFF state during a photometry and the switch SW10 which becomes ON at a time of a continuous photographing mode is also left in OFF state, the output signal of the AND gate A7 is at a high level. As a result, the up-down counter CN4 is placed in a reset state, and the output signal of the decoder DEC connected to the output terminals Q1, Q2, Q3 of the up-down counter CN4 will have only Q0 to have a high level, and the selection circuit RM will not select any one of the output terminals S1 to S7. As a result, any one of the segments in the liquid crystal driving circuit LDR will not function. That is, the diaphragm LAP is left at the full-open position. When a release action of the camera starts after a photometry is made at the full-open position as mentioned above, the switch SW5 becomes ON just before a mirror up, therefore the resetting of the up-down counter CN4 is released and the clock pulses from the pulse generator CG1 are added to the up-down counter CN4 through the AND gate A4. And the counted value of the up-down counter CN4 and the aperture value set through the switches SWA1, SWA2, SWA3 are compared by the digital comparator DCP3 into which these values are introduced and when they coincide to each other the output signal from the A=B terminal of the digital comparator DCP3 becomes to have a high level, therefore, the AND gate A4 becomes to have a low level, and as a result, the introduction of the clock pulses from the pulse generator CG1 into the up-down counter CN4 is prohibited.

Now, if the switches SWA1, SWA2 have been placed in OFF state and the switch SWA3 has been placed in ON state corresponding to the preset aperture value, the signals from the output terminals Q1, Q2, Q3 of the up-down counter CN4 will have a high level, a high level, and a low level, respectively by the above-mentioned operation. Therefore, the output signal Q3 only in the decoder DEC becomes to have a high level, and the segment outputs from the segment output terminals S1, S2, S3 in the selection circuit RM will have a high level as shown in the drawing, then the diaphragm LAP will be stopped down by three steps from the full open position by the predetermined driving action of the liquid crystal driving circuit LDR.

When the shutter control is completed and the mirror is held down again, the switch SW5 becomes OFF, therefore, the output signal of the AND gate A7 becomes to have a high level. As a result, the up-down counter CN4 is reset again, and the diaphragm LAP is returned to the full-open position again.

Next, in the case of a continuous photographing mode, as the switch SW10 is ON, the resetting of the up-down counter CN4 is prohibited, thus the diaphragm will not be returned to the full open position every time a photographing is completed, and a diaphragm aperture control will be done in a same process as in the case of FIG. 1.

As has been explained above, in the present invention, even if a diaphragm without a high speed responsive characteristic is used, an automatic exposure control in a continuous photographing is carried out by a shutter control with a photometry in a stopped down aperture, thus allowing photographings to be made without returning a diaphragm to its full-open position for every phototaking at a time of a continuous photographing mode, so that an automatic exposure control device which allows a high speed continuous photographing can be provided.

What I claim:

1. In a camera having means for adjusting an aperture opening, by using an electro-driven means and a light metering circuit receptive of light passing through said aperture opening, whereby after a light metering operation has been carried out, an exposure operation is executed, said camera including:
    (a) an aperture signal forming circuit for producing an aperture control signal;
    (b) means for detecting an aperture opening condition controlled by said aperture adjusting means, said detecting means determining whether or not the aperture opening condition is suited for the light metering operation and producing an output when the aperture opening is not in the condition suited for the light metering operation;
    (c) a diaphragm drive circuit responsive to the output of said detecting means for driving said aperture adjusting means in a direction to the aperture opening condition for light metering during the light metering operation before said exposure operation;
    (d) inhibiting means for inhibiting the response to the output of the detecting means of the diaphragm drive circuit by a shutter release operation, the camera being shifted from said light metering operation to said exposure operation by the shutter release operation; and
    (e) a control circuit for transferring the aperture control signal from said aperture signal forming circuit to said drive circuit when in the exposure operation, thereby the aperture opening is changed to a condition corresponding to said aperture control signal.

2. A camera according to claim 1, wherein said electro-driven means is an electromagnetically operated motor.

3. A camera according to claim 1, wherein said diaphragm drive circuit has a pulse forming circuit and said electro-driven means is driven by pulses from said pulse forming circuit and transfers the pulses to the electro-driven means in response to the outputs of said detecting means while said outputs are being formed.

4. A camera capable of performing successive photography by continuously repeating photographic operation, comprising:
   (a) diaphragm means for electromagnetically controlling an aperture opening;
   (b) a light metering circuit for metering the light coming through said aperture opening; and
   (c) a diaphragm control circuit for controlling said diaphragm means according to an output of said light metering circuit before the taking of each photograph, said diaphragm means holding the aperture controlled before the taking of a photograph even after completion of the taking of a prior photograph, whereby the aperture state after completion of the taking of a photograph is transferred to an aperture opening for the taking of a next photograph according to the metering output of the light coming through said aperture opening.

5. A camera according to claim 4, wherein said diaphragm control circuit controls an aperture opening of a subsequent photography in accordance with a difference between the light metering output through an aperture opening representing the diaphragm value of a preceding photography and the diaphragm value of the preceding photography.

6. A camera according to claim 4, wherein said diaphragm control circuit has a pulse forming circuit and a signal path for transferring to said diaphragm means a number of pulses corresponding to the light metering output at the time of a subsequent photography.

7. A camera having a first mode in which photography is carried out at every operation of a release operation member and a second mode in which photography is continuously repeated while the release operation member is being operated, comprising:
   (a) diaphragm means for electromagnetically controlling an aperture opening;
   (b) a light metering circuit for metering the light coming through said aperture opening; and
   (c) an aperture control circuit for transforming the diaphragm means after completion of the taking of a photograph to a fully opened state in the first mode and for controlling the aperture opening by controlling the diaphragm means according to a light metering output on the basis of the light coming through the aperture opening the fully opened state at the time of the next photograph taking by operation of the release operation member, said circuit transferring the aperture state after completion of the taking of a photograph to the aperture for the taking of the next photograph according to the metering output of the light coming through the aperture opening while the aperture opening after completion of the taking of a photograph is maintained in the second mode.

8. A camera according to claim 7, wherein said aperture control circuit has a pulse forming circuit and a signal path for transferring the pulse from the pulse forming circuit to the diaphragm means after completion of photography in a direction to open the aperture in the first mode, said signal path being prohibited in the second mode.

9. A camera capable of performing successive photography by continuously repeating photographic operation, comprising:
   (a) diaphragm means for defining an aperture opening;
   (b) a light metering circuit for metering the light coming through said aperture opening; and
   (c) a diaphragm control circuit for controlling said diaphragm means according to an output of said light metering circuit before the taking of each photograph, said diaphragm means holding the aperture controlled before the taking of a photograph even after completion of the taking of a prior photograph, whereby the aperture state after completion of the taking of a photograph is transferred to an aperture opening for the taking of a next photograph according to the metering output of the light coming through said aperture opening.

10. A camera having a first mode in which photography is carried out at every operation of a release operation member and a second mode in which photography is continuously repeated while the release operation member is being operated, comprising:
    (a) diaphragm means for defining an aperture opening;
    (b) a light metering circuit for metering the light coming through said aperture opening; and
    (c) an aperture control circuit for transforming the diaphragm means after completion of the taking of a photograph to a fully opened state in the first mode and for controlling the aperture opening by controlling the diaphragm means according to a light metering output on the basis of the light coming through the aperture opening in the fully opened state at the time of the next photograph taking by operation of the release operation member, said circuit transferring the aperture state after completion of the taking of a photograph to the aperture for the taking of the next photograph according to the metering output of the light coming through the aperture opening while the aperture opening after completion of the taking of a photograph is maintained in the second mode.

11. A camera according to claim 9 or 10, wherein said diaphragm means controls the aperture opening electrooptically.

12. A camera transferrable from a light metering mode into an exposure mode by the operation of a shutter release operation member comprising:
    (a) diaphragm means;
    (b) a light metering circuit for metering the light coming through an opening formed by the diaphragm means;
    (c) an opening control circuit for detecting whether the diaphragm means is in a fully opened state or not in a light metering mode before the operation of the shutter release operation member and for producing an output when the diaphragm is not in the fully opened state so as to transfer the diaphragm means to the fully opened state, said circuit being made inoperative by the operation of the shutter release operation member; and
    (d) an aperture control circuit for generating a signal for shifting the opening of the diaphragm means to a preset aperture value.

13. A camera transferrable from a light metering mode into an exposure mode by the operation of a shutter release operation member comprising:
    (a) diaphragm means;

(b) a light metering circuit for metering the light coming through an opening formed by the diaphragm means;

(c) an opening control circuit for generating a signal for transferring the diaphragm means into a fully opened state in the light metering mode before the operation of the shutter release operation member so as to transfer the diaphragm means into the fully opened state, said circuit being made inoperative by the operation of the release operation member; and (d) an aperture control circuit for generating a signal for shifting the opening of the diaphragm means to a preset aperture value.

14. A camera transferable from a light metering mode into an exposure mode by the operation of a shutter release operation member comprising:

(a) diaphragm means;

(b) a light metering circuit for metering the light coming through an opening formed by the diaphragm means;

(c) an opening control circuit for detecting whether the diaphragm means is in a fully opened state or not in a light metering mode before the operation of the shutter release operation member and for producing an output when the diaphragm is not in the fully opened state so as to transfer the diaphragm means to the fully opened state, said circuit being made inoperative by the operation of the shutter release operation member; and (d) an aperture control circuit for generating a signal for shifting the opening of the diaphragm means to an aperture value according to the metering output of the light.

15. A camera transferable from a light metering mode into an exposure mode by the operation of a shutter release operation member, comprising:

(a) diaphragm means;

(b) a light metering circuit for metering the light coming through an opening formed by the diaphragm means;

(c) an opening control circuit for generating a signal for transferring the diaphragm means into a fully opened state in the light metering mode before the operation of the shutter release operation member so as to transfer the diaphragm means into the fully opened state, said circuit being made inoperative by the operation of the release operation member; and (d) an aperture control circuit for generating a signal for shifting the opening of the diaphragm means to an aperture value according to the metering output of the light.

16. A camera according to claim 12, 13, 14 or 15, wherein said diaphragm means is driven by the electro-driven means.

17. A camera according to claim 12, 13, 14 or 15, wherein said diaphragm means is driven by the electro-motor.

18. A camera according to claim 12, 13, 14 or 15, wherein said aperture control circuit transfers the shifting signal to the diaphragm means by the operation of the shutter release operation member.

* * * * *